(12) United States Patent
Wagner et al.

(10) Patent No.: US 6,355,735 B1
(45) Date of Patent: Mar. 12, 2002

(54) SEMI-INTERPENETRATING POLYMER NETWORK FROM EPOXY MONOMER AND OLEFIN

(75) Inventors: Mark I. Wagner, Austin; Stephen D. Meyer, Lakeway, both of TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/375,706

(22) Filed: Aug. 17, 1999

(51) Int. Cl.⁷ .................. C08L 23/20; C08L 23/24; C08F 297/08
(52) U.S. Cl. ............ 525/320; 525/322; 525/324; 525/333.8; 525/903
(58) Field of Search ............. 525/321, 98, 903, 525/320, 322, 324, 333.8

(56) References Cited

U.S. PATENT DOCUMENTS

| | | | |
|---|---|---|---|
| 4,387,222 A | 6/1983 | Koshar | 544/4 |
| 4,505,997 A | 3/1985 | Armand et al. | 429/192 |
| 5,021,308 A | 6/1991 | Armand et al. | 429/194 |
| 5,072,040 A | 12/1991 | Armand | 564/82 |
| 5,162,177 A | 11/1992 | Armand et al. | 429/194 |
| 5,273,840 A | 12/1993 | Dominey | 429/192 |
| 5,393,867 A | 2/1995 | Matayabas, Jr. et al. | 528/412 |
| 5,709,948 A | * 1/1998 | Perez et al. | 525/107 |
| 5,942,461 A | 8/1999 | Brown et al. | 502/154 |
| 6,001,936 A | * 12/1999 | Barrera et al. | 525/122 |

FOREIGN PATENT DOCUMENTS

| | | |
|---|---|---|
| EP | 0 454 231 A2 | 10/1991 |
| WO | WO 94/29358 | 12/1994 |
| WO | WO 96/23010 | 8/1996 |
| WO | WO 98/37110 | 8/1998 |
| WO | WO 98/40374 | 9/1998 |
| WO | WO 98/40420 | 9/1998 |
| WO | WO 98/42440 | 10/1998 |
| WO | WO 98/42665 | 10/1998 |
| WO | WO 99/05189 | 2/1999 |

OTHER PUBLICATIONS

L.K. Johnson, et al, "New Pd(II)– and Ni(II)–Based Catalysts for Polymerization of Ethylene and α–Olefins", *J. Am. Chem. Soc.* 1995, vol. 17, pp. 6414–6415.

L. Turowsky, et al, "Tris((trifluoromethyl)sulfonyl)methane, $HC(SO_2CF_3)_3$", *Inorg. Chem.* 1988, vol. 27, pp. 2135–2137.

H.H. Brintzinger, et al, "Stereospecific Olefin Polymerization with Chiral Metallocene Catalysts", *Angew. Chem. Int. Ed. Engl.* 1995, vol. 34, pp. 1143–1170.

* cited by examiner

Primary Examiner—Robert E. L. Sellers
(74) Attorney, Agent, or Firm—Darla P. Fonseca; Philip Y. Dahl

(57) ABSTRACT

A semi-interpenetrating polymer network including at least one epoxy monomer, at least one olefin monomer forming a co-monomer mixture with the epoxy monomer and a catalytic amount of at least one palladium compound uniformly distributed in said co-monomer mixture to promote formation of the semi-interpenetrating polymer network under ambient conditions.

16 Claims, No Drawings

SEMI-INTERPENETRATING POLYMER NETWORK FROM EPOXY MONOMER AND OLEFIN

FIELD OF THE INVENTION

The invention relates to semi-interpenetrating polymer networks comprising polyepoxy and polyolefin chains formed during the catalyzed reaction of solutions containing epoxy monomers and alpha-olefin monomers. Reaction of the monomers, promoted by a metal catalyst, proceeds under ambient conditions.

BACKGROUND OF THE INVENTION

Polymerization of α-olefins using either heterogeneous Ziegler-Natta systems or homogenous metallocene complexes is well known. Both of these catalytic systems are based on early metals such as Ti or Zr. The oxophilic nature of these metals results in catalysts that are extremely sensitive to both environmental conditions and functionalized monomers. As such, polymerizations utilizing these early metal catalyst systems must be done under rigorously inert conditions and in the absence of any monomers containing functionality such as ketones, esters, or epoxy groups.

Recently, a new class of α-olefin polymerization catalysts based on late metals such as Ni and Pd has been developed. The relatively robust nature of these metals endows these complexes with functional group tolerance that is unprecedented for an olefin polymerization catalyst. Using these catalysts, polymerization of α-olefins in air and even in water is possible for the first time.

PCT published application WO 96/23010 discusses the use of Ni and Pd catalysts for polymerization of olefin monomers. The published application further discusses blend combinations with other polymers including epoxy polymers. However, the reference does not address the formation of semi-interpenetrating networks comprising epoxy polymers and olefin polymers, which form in-situ from solutions containing epoxy and olefin monomers.

U.S. Pat. No. 5,393,867 discloses the use of Pd(0) compounds and nuclcophilic initiators to prepare linear polyethers from 3,4 epoxy-1-butene under inert conditions. PCT application WO 98/37110 discloses homopolymers and polyolefin copolymers containing pendant epoxy groups. Neither of these patents discloses simultaneous homopolymerization of epoxy and olefin monomers.

It has now been discovered that a semi-interpenetrating network may be formed from reactive co-monomer mixtures comprising an epoxy monomer, an olefin monomer, and an effective amount of an organometallic nickel or palladium complex.

SUMMARY OF THE INVENTION

The current invention provides a semi-interpenetrating network polymer formed from reactive co-monomer mixtures comprising at least one epoxy monomer and at least one olefin monomer. An effective amount of an organometallic nickel or palladium complex, uniformly distributed in the co-monomer mixture, promotes formation of a polyolefin polymer. The organometallic complex of nickel or palladium includes a bidentate ligand, sufficiently bulky to favor the formation of high molecular weight polyolefin polymers. Using selected materials, the polyolefin polymer formation occurs under ambient conditions and may be accompanied by polymerization of epoxy monomer to produce the interpenetrating network polymer of the invention.

This is viewed as simultaneous polymerization of epoxy and olefin monomers with formation of a semi-interpenetrating network. Alternatively, the olefin monomer, in the co-monomer mixture, may first be converted to an olefin polymer, using an organometallic complex of nickel or palladium, as previously described, with subsequent formation of the epoxy polymer through thermally activated epoxy initiators such as $Ar_3S^+SbF_6^-$ and $(mesitylene)_2Fe^+SbF_6^-$.

Semi-interpenetrating network polymer systems comprising polyolefin and epoxy polymers combine the advantages of low-cost, hydrophobic and chemically resistant polyolefins with improved adhesion and durability of polyepoxides. Additional benefits arise from the convenience of use of compositions of the invention. For example, the reactive mixture of monomers has a low viscosity that facilitates penetration and application of material into small spaces, followed by curing-in-place under ambient conditions. As evidence of further flexibility, the epoxy cure may be delayed until polymerization of olefin monomers occurs. This allows use of a multiple cure system which promotes cure of the olefin monomers under ambient conditions and subsequently polymerizes the epoxy monomers with traditional thermally activated catalysts, or through thennal activation of the palladium complex.

Whether formed by simultaneous or sequential polymerization processes, semi-interpenetrating networks, disclosed herein, exhibit a range of characteristics, from soft, predominantly polyolefin compositions to harder, predominantly polyepoxy compositions. Typical uses for these compositions include gels, sealants, coatings, adhesives, gaskets, vibration dampening materials, and reactive diluents/solvents.

As used herein, these terms have the following meanings.

1. The term "semi-interpenetrating network polymer" means a polymer system containing intimately mixed thermoplastic and thermoset polymeric species in which each polymer is independent of but thoroughly interspersed with the other. Polymer formation may occur simultaneously or sequentially.
2. The term "admixture of monomers" means a fluid system containing monomeric species one of which may act as a solvent or dispersion medium for another monomer.
3. The term "internal epoxy monomer" means a reactive monomer containing at least one α, β di-substituted non-terminal epoxy group.
4. The term "functional group tolerance" refers to the relatively low susceptibility of certain catalysts to be de-activated/inhibited by oxygen containing species, such as alcohols, ketones and the like.
5. The term "metal catalyst" refers to donor ligand containing, organometallic compounds of nickel and palladium having ligands of sufficient steric bulk to facilitate formation of polyolefins and a metal to R bond, wherein R is H, a hydrocarbyl radical, or a hydrocarbyl radical substituted by at least one alkyl, haloalkyl or aryl group, each group having up to 20 carbon atoms.
6. The term "alpha olefin" (or α-olefin) and "alpha olefin hydrocarbon" are equivalent and mean a hydrocarbon containing a double bond in the 1-position, more particularly, ethylene or a 1-olefin containing three or more carbon atoms which may be cyclic or acyclic and preferably is an acyclic alpha-olefin.

All parts, percents and ratios herein are "by weight" unless expressly otherwise noted.

DETAILED DESCRIPTION OF THE INVENTION

The present invention describes a semi-interpenetrating network formed from an alpha-olefin hydrocarbon monomer, an epoxy monomer, and an effective amount of an organometallic catalyst comprising a Group VIII metal (CAS version of the Periodic Table), preferably Ni or Pd, and a polydentate ligand having steric bulk sufficient to permit formation of high polymer, and at least one of water and air (oxygen).

Polyolefins are used in a wide range of product applications. The breadth of potential applications for a polyolefin depends largely upon characteristics attainable through catalyst and/or monomer selection, including e.g., polymer regiochemistry and stereochemistry, molecular weight and molecular weight distribution, and chain branching. Extension of the versatility of olefin-containing materials results from incorporation of alpha functionalized monomers with olefin polymers in the form of copolymers and block copolymers. In these cases, both olefinic and functionalized monomers are incorporated into a common polymer chain.

Another way to include contributions from different chemical species is the formation of stable, non-separating blends of homopolymers or the production of one homopolymer species in the presence of another homopolymer to yield some form of interpenetrating network polymer. Preferably, for the present invention, the interpenetrating network is a semi-interpenetrating network formed from a co-monomer mixture, in which epoxy monomers homopolymerize simultaneously with olefin monomer homopolymerization. Another useful means of forming semi-interpenetrating networks of the invention involves subjecting a mixture of monomers to a sequential process that produces the olefin polymer before polymerization of the epoxy monomer occurs. Polymer formation in this way distinguishes these materials from polymer blends in which multiple monomers are separately pre-polymerized and then combined using a suitable mixing or compounding technique.

Formation of a semi-interpenetrating network of polymers implies the development of one species of homopolymer chain uniformly interspersed with chains of at least one other homopolymer. While separate homopolymer species exist together, the materials they provide exhibit properties based on the contributions of each homopolymer included in the semi-interpenetrating network. A unique combination of homopolymers should give a new range of semi-interpenetrating network properties depending upon the relative amounts of monomers selected for polymerization. In selecting the type of homopolymer to be incorporated in the semi-interpenetrating network, consideration must be given to the probability of reaction between differing species of monomer and any influence associated with other reactants such as catalysts or polymerization accelerators.

The current invention provides semi-interpenetrating networks by polymerizing epoxy monomers combined with olefin monomers in the presence of nickel and palladium catalysts. Network formation may proceed by two different mechanisms: simultaneous polymerization or sequential polymerization of the two monomer species. During the process of polymerization, the developing polyolefins remain separate from the polyepoxides, although intimately interspersed therewith. Polyepoxide formation, catalyzed by nickel and palladium complexes, represents a distinguishing feature of this invention, since no prior art discloses any significant epoxy homopolymer formation using nickel or palladium catalysts under ambient conditions.

A characteristic of these catalysts is a cationic portion of the formula LM—$R^+$ wherein a metal M is either nickel or palladium, L is a two-electron donor ligand or ligands to stabilize the metal and R is H, a hydrocarbyl radical or a substituted hydrocarbyl radical wherein the substituting groups may be alkyl (1–10 carbon atoms), aryl (5–20 carbon atoms) or halogen substituted alkyl. A preferred cationic portion has the formula $(L^I)_2M$—$R^+$ where the two $L^I$ groups are joined through chemical bonds and each $L^I$ is a two electron donor ligand. M and R are as defined previously.

The current invention confirms a general lack of reactivity of the metal catalyst toward epoxy monomers, except for monomers of a specific structure type and then only under certain conditions. All epoxy monomers investigated show little, if any, reactivity toward the metal catalyst itself. Only in the presence of both epoxy and α-olefin monomers is significant epoxy reactivity observed. While not wishing to be bound by theory, the α-olefin appears to interact with the metal complex to form a transient intermediate which promotes formation of polyepoxides more readily than the initial metal complex itself. Significant epoxy reactivity is observed only for non-glycidyl epoxies, such as those formed from olefin epoxidation. Among non-glycidyl epoxies, internal epoxies are more reactive than those with a terminal functionality. The epoxy monomer 2,3-epoxypentane is an example of an epoxy model compound with internal functionality which would have suitable reactivity in the system described.

Despite limitation on the type of epoxy monomer, polymerization of the proper combination of α-olefin and epoxy monomers, using metal catalysts, yields semi-interpenetrating polymer networks with a variety of physical properties. Typical properties include tear strengths from about 3 lbf/in to about 100 lbf/in (ASTM D626); hardness from about 21 Shore 00 to about 96 Shore 00; tensile strength at break from about 10 psi to about 630 psi (measured using ASTM D412); and tensile strain at break of 80% to 1060%. Material properties extend from relatively soft, fluid materials, suitable for, e.g., gels and sealants, to relatively hard rubbery materials suitable for applications such as vibration dampening. This range of properties results predominantly from adjustment of the epoxy monomer concentration, catalyst concentration, and chain length of α-olefin monomers.

Alpha-olefin hydrocarbon monomers useful in the invention include substituted and unsubstituted, including acyclic, branched, and cyclic alpha-olefins, wherein substituents on the olefin do not interfere with the polymerization process. Such optional substituents include carboxylic acid and ester groups. Alpha-olefins preferred for polymerizations of the invention can have from 2 to about 30 carbon atoms, and include acyclic alpha-olefins such as ethylene, propylene, 1-butene, 1-pentene, 1-hexene, 1-heptene, 1-octene, 1-decene, 1-dodecene, 1-tetradecene, 1-octadecene, 1-octadecene, 1-eicosene, and the like, and cyclic alpha-olefins such as cyclopentene, and combinations thereof. Most preferably, alpha-olefins include propene, 1-butene, 1-hexene, 1-octene, and other alpha-olefins up to about $C_{20}$. In some embodiments, liquid monomers are preferred, and higher boiling alpha-olefins, e.g., 1-octene to about 1-hexadecene, are particularly preferred. Physical properties of polyolefins are affected by selection of catalysts, individual monomers and functionalized co-monomers. See, e.g., *Handbook of Polyolefins, Synthesis and Properties*, Edited by Cornelia Vasile and Raymond B Seymour, Marcel Dekker, Inc. New York, *Stereospecific Olefin Polymerization* with *Chiral Metallocene Catalysts,* Hans H. Brintzinger, et al., Angew. Chem. Intel. Ed. Engl. 1995, 34, 1143–1170, and *Principles of Polymerization,* Third Edition, George Odian, John Wiley & Sons, Inc., New York.

Useful epoxy monomers include multifunctional non-glycidyl epoxy monomers preferably containing a majority of di-substituted epoxy groups. Examples of suitable epoxy monomers include L-207 (a Kratong® block copolymer containing an epoxidized isoprene block and a saturated ethylene/butylene block having a terminal hydroxyl group) available from Shell Chemical and EMS-232 (a cyclohexyl epoxy functionalized siloxane) from Gelest. In addition to the parameters described above, appropriate epoxy monomers should be free from functionality which inhibits catalysis, e.g. amine groups, and also should be at least partially soluble in α-olefin monomers. Alpha-olefins that may act as solvents for epoxy monomers include octene, dodecene, and other liquid α-olefins.

Organometallic catalysts useful in the invention comprise metals of Periodic Group VIII, ligands providing steric bulk sufficient to permit formation of high polymers, and a metal to R bond, wherein R is H, a hydrocarbyl radical, or a hydrocarbyl radical substituted by at least one of alkyl, haloalkyl or aryl groups. Periodic Group VIII metals include Fe, Ru, Os, Co, Rh, Ir, Ni, Pd and Pt, and preferred metals are Co, Ni and Pd. Ni and Pd are especially preferred, and Pd is most preferred. Ligands (L) can be selected so that, when they are coordinated to the metal atom, they are of sufficient size so as to block steric access to certain coordination sites on the metal atom. Examples include ArN=C(R$^1$)C(R$^1$)=NAr, wherein Ar is 2,6-C$_6$H$_3$(R$^3$)$_2$, where each R$^1$ independently can be H or methyl or the two R$^1$ groups taken together can be 1,8-naphthalene-diyl, and each R$^3$ independently can be methyl, ethyl, isopropyl, or tert-butyl. Without wishing to be bound by theory, it is believed that blocking certain sites will reduce or eliminate processes which result in displacement of the polymer chain from the metal, which prematurely terminates polymerization and results in lower polymer molecular weights. Thus, steric bulk in the ligand permits the formation of high polymer.

Other examples of suitable bidentate ligands in which N, P, O, S, As, or Sb are chelated to the metal can be found at e.g., PCT published applications WO 96/23010, WO 98/40420, WO 98/42665, WO 98/42440, and WO 98/40374, all of which are incorporated herein by reference.

Preferred catalysts comprise ligands that are chelating. Chelating means that a ligand molecule contains two or more atoms or groups of atoms that are able to form coordinate links to a central metal atom. Preferred atoms or groups of atoms are two-electron donors, preferably containing nitrogen, more preferably containing an imine

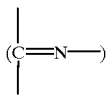

group. Most preferably a chelating ligand comprises two imine groups. Imine groups bearing a substituted or unsubstituted group on the nitrogen are preferred, more preferably such groups are polysubstituted aryl, and most preferably they are 2,6-disubstituted aryl. Substituents on the aryl ring include alkyl, haloalkyl, and aryl, preferably alkyl, more preferably methyl or isopropyl, and most preferably isopropyl. Catalysts also comprise an atom or group R, defined below, which preferably is H or methyl, most preferably methyl.

Organometallic catalysts useful in the invention can be one-part or two-part. One-part catalysts are organometallic salts of a Group VIII metal and a polydentate ligand having steric bulk sufficient to permit formation of high polymer, and an anion selected from the group consisting of B(C$_6$F$_5$)$_4$$^-$, PF$_6$$^-$, SbF$_6$$^-$, AsF$_6$$^-$, BF$_4$$^-$, B[3,5-C$_6$H$_3$(CF$_3$)$_3$]$_4$$^-$, (R$_f$SO$_2$)$_2$CH$^-$, (R$_f$SO$_2$)$_3$C$^-$, (R$_f$SO$_2$)$_2$N$^-$, and R$_f$SO$_3$$^-$, wherein R$_f$ is as defined below, which, when added to monomer, can immediately begin to form polymer, such that no additional reagents or further reactions are necessary to generate an active polymerization catalyst. Such catalysts are advantageous in certain processes, particularly when it is desired that a catalyst is to be added to the reaction mixture immediately before polymerization is to begin. For example, such catalysts can be useful in batch reactions used to prepare polymer. One-part catalysts can be isolated and are essentially pure compounds. One-part catalysts are preferably cationic complexes, and further comprise non-coordinating counterions.

Preparation of one-part Group VIII metal complexes useful as catalysts in polymerizable compositions of the invention have been described in the previously-mentioned European Patent Application No. 454,231, and the article by Johnson, et al (*J Am. Chem. Soc.,* 1995, 117, 6414–6415), wherein these catalysts were disclosed to be useful in inert atmospheres. The catalysts were characterized as complexes having a cationic portion of the formula

LM—R$^+$ wherein M is a Group VIII metal, L is a two-electron donor ligand or ligands, as defined above, stabilizing the Group VIII metal, and R is H, a hydrocarbyl radical or a substituted hydrocarbyl radical, wherein the substituting groups can be alkyl (1 to 10 carbon atoms), aryl (5 to 20 carbon atoms), or halogen substituted alkyl.

Examples of anions useful in the practice of the present invention include:
(C$_2$F$_5$SO$_2$)$_2$N$^-$, (C$_4$F$_9$SO$_2$)$_2$N$^-$, (C$_8$F$_{17}$SO$_2$)$_3$C$^-$, (CF$_3$SO$_2$)$_3$C$^-$, (CF$_3$SO$_2$)$_2$N$^-$, (C$_4$F$_9$SO$_2$)$_3$C$^-$, (CF$_3$SO$_2$)$_2$(C$_4$F$_9$SO$_2$)C$^-$, (CF$_3$SO$_2$)(C$_4$F$_9$SO$_2$)N$^-$, [(CF$_3$)$_2$NC$_2$F$_4$SO$_2$]$_2$N$^-$, (CF$_3$)$_2$NC$_2$F$_4$SO$_2$C$^-$(SO$_2$CF$_3$)$_2$, (3,5-bis(CF$_3$)C$_6$H$_3$)SO$_2$N$^-$SO$_2$CF$_3$, C$_6$F$_5$SO$_2$C$^-$(SO$_2$CF$_3$)$_2$, C$_6$F$_5$SO$_2$N$^-$SO$_2$CF$_3$, CF$_3$SO$_3$$^-$, C$_8$F$_{17}$SO$_3$$^-$,

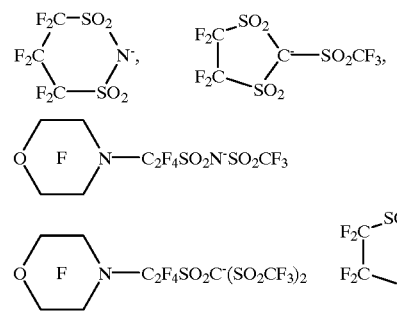

wherein F in the ring means the ring carbon atoms the ring carbon atoms are perfluorinated, and the like. More preferred anions are those described by N(SO$_2$R$_f$)$_2$$^-$ wherein R$_f$ is a perfluoroalkyl radical having 1–4 carbon atoms.

Anions of this type, and representative syntheses, are described in, e.g., U.S. Pat. Nos. 4,505,997, 5,021,308, 4,387,222, 5,072,040, 5,162,177, and 5,273,840, incorporated herein by reference, and in Turowsky and Seppelt, *Inorg. Chem.*, 1988, 27, 2135–2137. [C(SO$_2$CF$_3$)$_3$]$^-$, [N(SO$_2$CF$_3$)$_2$]$^-$ and [N(SO$_2$C$_2$F$_5$)$_2$]$^-$ are preferred, and [N(SO$_2$CF$_3$)$_2$]$^-$ and [N(SO$_2$C$_2$F$_5$)$_2$]$^-$ are particularly preferred. Such counterions may be preferred with certain metals and ligands, or in some processes. Other useful fluorinated non-coordinating counterions include PF$_6^-$, SbF$_6^-$, AsF$_6^-$, BF$_4^-$., and B(3,5-C$_6$H$_3$(CF$_3$)$_2$)$_4^-$.

In the preparation of one-part catalysts of the invention, diethyl ether can be useful, but it is preferable to avoid its use because it can be dangerous to store and handle due to its extreme flammability and tendency to form explosive peroxides. Alternative useful ethers are organic compounds containing one ether-type oxygen atom and include tetrahydrofuran and methyl t-butyl ether. Methyl t-butyl ether is particularly preferred.

Preferred compositions can be of the formula

[(ArN=C(R$^1$)C(R$^1$)=NAr)Pd(Me)(ether)]$^+$Q$^-$

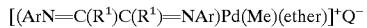

wherein Ar and R$^1$ are as previously defined and ether can be tetrahydrofuran, diethyl ether, or methyl t-butyl ether, and Q can be selected from B(C$_6$F$_5$)$_4$, anions as shown, PF6, SbF$_6$, AsF$_6$, and BF$_4$. Particularly preferred are compounds wherein ether is methyl t-butyl ether and Q is selected from N(SO$_2$R$_f$)$_2^-$ and anions as shown.

Examples of preferred novel one-part catalysts include:

[[(2,6-C$_6$H$_3$(i-Pr)$_2$)N=C(CH$_3$)C(CH$_3$)=N(2,6-C$_6$H$_3$(i-Pr)$_2$))Pd(CH$_3$)(Me t-butyl ether)]$^+$[B(C$_6$F$_5$)$_4$]$^-$,

[[(2,6-C$_6$H$_3$(i-Pr)$_2$)N=C(CH$_3$)C(CH$_3$)=N(2,6-C$_6$H$_3$(i-Pr)$_2$))Pd(CH$_3$)(tetrahydrofuran)]$^+$[B(C$_6$F$_5$)$_4$]$^-$,

[[(2,6-C$_6$H$_3$(i-Pr)$_2$)N=C(CH$_3$)C(CH$_3$)=N(2,6-C$_6$H$_3$(i-Pr)$_2$))Pd(CH$_3$)-(Et$_2$O)]$^+$[N(SO$_2$CF$_3$)$_2$]$^-$,

[((2,6-C$_6$H$_3$(i-Pr)$_2$)N=C(CH$_3$)C(CH$_3$)=N(2,6-C$_6$H$_3$(i-Pr)$_2$))Pd(CH$_3$)(Me t-butyl ether)]$^+$[N(SO$_2$C$_2$F$_5$)$_2$]$^-$,

[((2,6-C$_6$H$_3$(Me)$_2$)N=C(CH$_3$)C(CH$_3$)=N(2,6-C$_6$H$_3$(Me)$_2$))Pd(CH$_3$)-(tetrahydrofuran)]$^+$[B(C$_6$F$_5$)$_4$]$^-$,

[((2,6-C$_6$H$_3$(Me)$_2$)N=C(CH$_3$)C(CH$_3$)=N(2,6-C$_6$H$_3$(Me)$_2$))Pd(CH$_3$)(Me t-butyl ether)]$^+$[N(SO$_2$CF$_3$)$_2$]$^-$,

[((2,6-C$_6$H$_3$(Me)$_2$)N=C(CH$_3$)C(CH$_3$)=N(2,6-C$_6$H$_3$(Me)$_2$))Pd(CH$_3$)-(Et$_2$O)]$^+$[N(SO$_2$CF$_3$)$_2$]$^-$,

[((2,6-C$_6$H$_3$(Me)$_2$)N=C(CH$_3$)C(CH$_3$)=N(2,6-C$_6$H$_3$(Me)$_2$))Pd(CH$_3$)-(tetrahydrofuran)]$^+$[N(SO$_2$CF$_3$)$_2$]$^-$,

[((2,-C$_6$H$_3$(i-Pr)$_2$)N=C(CH$_3$)C(CH$_3$)=N(2,6-C$_6$H$_3$(i-Pr)$_2$))Pd(CH$_3$)(Me t-butyl ether)]$^+$[N(SO$_2$CF$_3$)(SO$_2$C$_4$F$_9$)]$^-$,

[((2,6-C$_6$H$_3$(i-Pr)$_2$)N=C(CH$_3$)C(CH$_3$)=N(2,6-C$_6$H$_3$(i-Pr)$_2$))Pd(CH$_3$)-(Et$_2$O)]$^+$[N(SO$_2$CF$_3$)(SO$_2$C$_4$F$_9$)]$^-$,

[((2,6-C$_6$H$_3$(i-Pr)$_2$)N=C(CH$_3$)C(CH$_3$)=N(2,6-C$_6$H$_3$(i-Pr)$_2$))Pd(CH$_3$)(Me t-butyl ether)]$^+$[NSO$_2$(CF$_2$)$_2$SO$_2$]$^-$, and

[((2,6-C$_6$H$_3$(i-Pr)$_2$)N=C(CH$_3$)C(CH$_3$)=N(2,6-C$_6$H$_3$(i-Pr)$_2$))Pd(CH$_3$)(Et$_2$O)]$^+$[NSO$_2$(CF$_2$)$_2$SO$_2$]$^-$, and the like.

Two-part catalysts comprise two reagents, a neutral organometallic compound and a co-catalyst salt, that react upon mixing optionally in the presence of monomer to yield an active catalyst. Two-part catalysts are particularly advantageous when partial mixing of monomer and an organometallic compound is desired (such as to achieve good solubility or suspension), but when it is also desired to initiate polymerization at a later time, for instance, when the second reagent is added. Process advantages resulting from the ability to control the time at which polymerization begins are significant. Two-part catalysts may also allow for the in-situ generation of active catalytic compounds which cannot be isolated, and may also be preferred for those situations where the added time and expense of isolating a one-part catalyst are not warranted. For "in-field" applications where the chemistry would need to be packaged in two parts, e.g., part A and part B, two-part catalysts would further facilitate packaging flexibility.

Two-part catalysts preferably comprise a neutral organometallic Pd or Ni compound which includes a ligand or ligands as previously defined, a moiety R which is H, hydrocarbyl radical, or substituted hydrocarbyl radical, and a halogen atom (preferably chlorine), and a co-catalyst. Preferred neutral compounds can be of the general formula

[ArN=C(R$^1$)C(R$^1$)=NAr]M(R)X

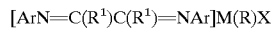

where Ar, R and R$^1$ are as defined above, and X represents a halogen atom, preferably chlorine or bromine, most preferably chlorine.

Examples of preferred neutral compounds include:

(2,6-dimethylphenyl)N=C(Me)C(Me)=N(2,6-dimethylphenyl)Pd(Me)Cl,
(2,6-diisopropylphenyl)N=C(Me)C(Me)=N(2,6-diisopropylphenyl)Pd(Me)Cl,
(2,6-diisopropylphenyl)N=C(H)C(H)=N(2,6-diisopropylphenyl)Pd(Me)Cl,
(2,6-dimethylphenyl)N=(1,2-acenaphthene-diyl)=N(2,6-dimethylphenyl)Pd(Me)Cl,

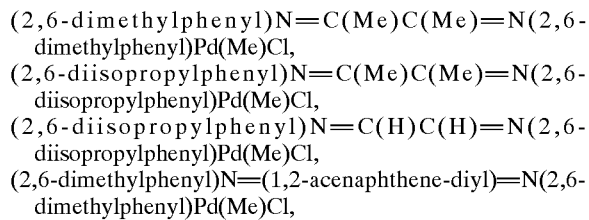

wherein 1,2-acenaphthene-diyl is represented by the structure

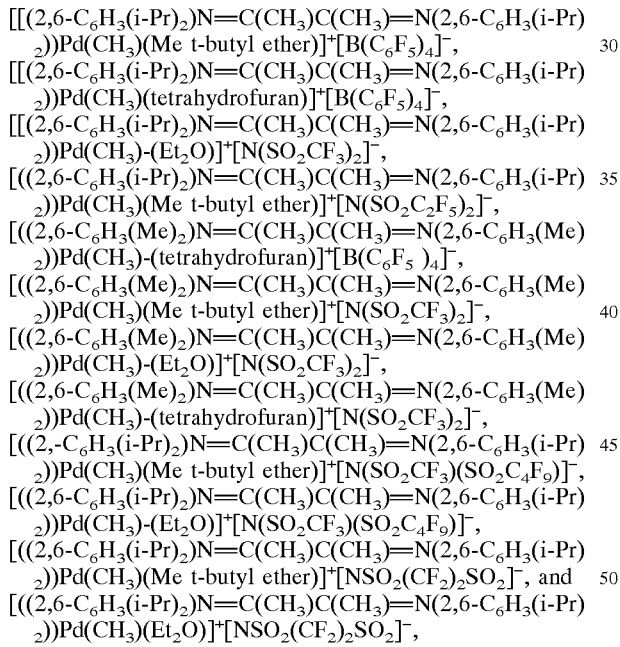

Especially preferred neutral compounds include (2,6-diisopropylphenyl )N=C(Me)C(Me)=N(2,6-diisopropylphenyl)Pd(Me)Cl.

Useful co-catalyst salts are of the general formula

A$^+$Q$^-$

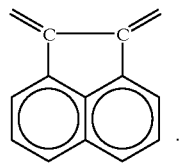

wherein A is selected from silver, thallium, and metals of Periodic Group IA, and Q is selected from B(3,5-C$_6$H$_3$(CF$_3$)$_2$)$_4$, B(C$_6$F$_5$)$_4$, anions as shown in PF$_6$, SbF$_6$, AsF$_6$, and BF$_4$, and solvates and hydrates thereof. For some applications, silver salts are preferred and can have the formulae Ag[B(C$_6$F$_5$)$_4$](arene)$_p$ and Ag[B(C$_6$H$_3$(CF$_3$)$_2$)$_4$](arene)$_p$, wherein arene can be an aromatic hydrocarbon group having 6 to 18 carbon atoms that can be substituted by up to 6 alkyl or aryl groups each having up to 12 carbon atoms; preferably arene can be benzene, toluene, ortho-, meta-, or para-xylene, and mesitylene, and p can be an integer 1, 2, or 3. However, in some applications the less expensive alkali metal salts (Periodic Group 1A) are preferred. Particular counterions may be preferred under specific reaction conditions.

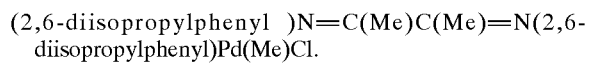

Examples of preferred co-catalyst salts include:

Ag$^+$[B(C$_6$F$_5$)$_4$]$^-$(toluene)$_3$, Ag$^+$[B(C$_6$F$_5$)$_4$]$^-$(xylene)$_3$, Ag$^+$[B(3,5-C$_6$H$_3$(CF$_3$)$_2$)$_4$]$^-$(toluene), Li$^+$[B(C$_6$F$_5$)$_4$]$^-$, Na$^+$[B(3,5-C$_6$H$_3$)$_2$)$_4$]$^-$, Li$^+$[N(SO$_2$CF$_3$)$_2$]$^-$, Li$^+$[B(C$_6$F$_5$)$_4$]$^-$

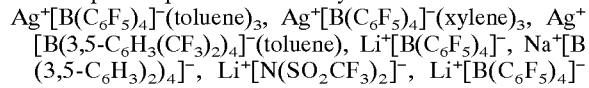

(Et₂O)₂, Li⁺[N(SO₂CF₃)(SO₂C₄F₉)]⁻, Li⁺[N(SO₂C₂F₅)₂]⁻, Li⁺[N(SO₂C₂F₅)₂]⁻(hydrate), Li⁺[N(SO₂C₄F₉)₂]⁻, Li⁺[NSO₂(CF₂)₂SO₂]⁻, Ag⁺[C(SO₂CF₃)₃]⁻, Li⁺[C(SO₂CF₃)₃]⁻, Ag⁺[CH(SO₂CF₃)₂]⁻, Li⁺[CH(SO₂CF₃)₂]⁻, Ag⁺[BF₄]⁻, Na⁺[BF₄]³¹, Na⁺[PF₆]⁻, Ag⁺[PF₆]⁻, NA⁺[SbF₆]⁻, Ag⁺[SbF₆]⁻, Na⁺[AsF₆]⁻, Ag⁺[AsF₆]⁻, Ag⁺[SO₃CF₃]⁻, Na⁺[SO₃CF₃]⁻, Na⁺[SO₃C₄F₉]³¹, and Ag⁺[SO₃C₄F₉]⁻, Ag⁺N(SO₂CF₃)₂⁻, and Ag⁺N(SO₂C₂F₅)₂⁻.

One- and two-part catalysts can be present in the invention mixture in the range of 0.0001 to about 3 weight percent, preferably 0.001 to 1 weight percent. A variety of methods for making such catalysts exist, and are discussed fully in U.S. Patent application Ser. No. 08/637,727, incorporated herein by reference.

There are two routes to the formation of semi-interpenetrating networks involving epoxy monomers and a-olefin monomers. One route involves simultaneous polymerization of the two different monomers, while the second route involves a sequential polymerization with polyolefin formation occurring first, and being followed by polyepoxy formation.

Simultaneous Polymerization

The metal catalyst is not an effective epoxy initiator for glycidyl epoxy monomers. However, it has been discovered that in the presence of terminal vinyl groups and non-glycidyl epoxy monomers, the metal complex will generate an effective in-situ catalyst for epoxides. An internal epoxy structure is more reactive than terminal non-glycidyl epoxy functionality. These observations were made in a series of NMR spectroscopy experiments in which various epoxy model epoxy structures were reacted with the Pd catalyst in the presence and absence of dodecene. A summary of the results from these studies is given in Table 1.

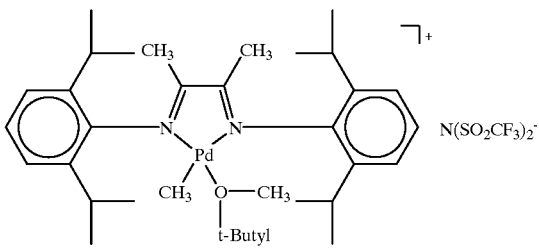

1

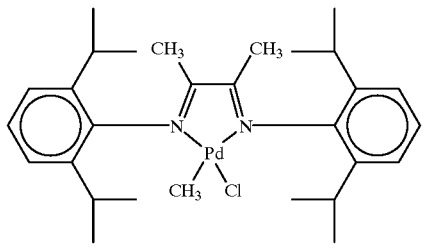

2

Results from benchtop reactions support the evidence from NMR experiments. Neat homopolymerization of dodecene using the Pd catalyst produces a waxy, crumbly solid (prior to precipitation) which dissolves in hot toluene. A solution of 20% L-207 monomer in dodecene catalyzed by Pd1, however, produces a viscoelastic, insoluble rubbery solid without precipitation. A solution of the glycidyl epoxy monomer Heloxy 71™ (Shell Chemical) in dodecene catalyzed by Pd1 shows no evidence of epoxy reactivity. A sample of Pd1 dissolved in pure L-207 shows no increase in viscosity after several months at room temperature.

TABLE 1

Epoxy Conversion in the Presence and Absence of α-Olefin for Three Epoxy Monomer Models

| Epoxy model compounds | degree of epoxy conversion[a] | |
|---|---|---|
| | with α-olefin | without α-olefin |
| (epoxide structure 1) | high | moderate |
| (epoxide structure 2) | moderate | low |
| (epoxide structure 3) | low | low |

[a] a high conversion is greater than 70%; moderate conversion is between 70% and 30%; low conversion is less than 30%

Complexes used in the following experimental section include Pd1 and Pd2, which have the formulations shown below.

EXPERIMENTAL

Preparation of a Simultaneous Cure Semi-Interpenetrating Polymer Network

The preparation of a semi-interpenetrating network of epoxy and olefin polymers begins by dissolving, for example, a Kraton® epoxy, designated L-207 (Shell Chemical) in a liquid α-olefin, followed by addition of the palladium catalyst Pd1, in a minimum amount of a suitable solvent such as dichloromethane or cyclohexanone. Kraton® L-207 is a high viscosity liquid block copolymer ($M_n$=6,600) containing a short epoxidized isoprene block and a hydrogenated ethylene/butylene body with a terminal hydroxyl group. Polymerization of the monomers proceeds at ambient temperature causing a viscosity increase in the reacting composition.

| Simultaneous Cure Example 1 | |
|---|---|
| Dodecene | 7.62 g (79.7%) |
| L-207 | 1.91 g (19.9%) |
| Pd1 catalyst | 0.03 g (0.3%) |

L-207 (19.9%) was dissolved in dodecene (79.7%) to provide a solution with a viscosity of about 6.0 cps. Palladium catalyst Pd1 (0.3%), was dissolved in a minimum amount of dichloromethane (<1 ml), and was degassed for about 5 minutes. It was added to the monomer solution and briefly shaken to distribute the catalyst, then left to sit under ambient conditions without agitation. Gel formation under these conditions occurred at 68 minutes. Ultimately, the reactive composition formed a rubbery solid that swelled in hot toluene and exhibited material properties that include tear strength (ASTM D624) of 103 lbf/in; Shore 00 hardness of 86; tensile at break (ASTM D412) of 625 psi and tensile strain at break of 380%.

| Simultaneous Cure Comparative Example 1C | |
|---|---|
| Dodecene | 10 g (99.6%) |
| Pd1 catalyst | 0.04 g (0.4%) |

Pd1 catalyst (0.4%), was dissolved in a minimum amount of dichloromethane (<1 ml), and was added to the α-olefin monomer, and briefly shaken to distribute the catalyst, then left to sit under ambient conditions without further agitation. The solution became a highly viscous non-pourable gel after 46 minutes. Ultimately, the reactive composition formed a very soft waxy paste with negligible tear and tensile properties, which dissolved in toluene within minutes at room temperature.

Simultaneous Cure Example 2

A solution of 12% L-207, 40% Kaydol oil (hydrogenated petroleum distillate mineral oil with $M_n$=430, Witco) and 48% dodecene was determined to have a viscosity of 11 cps. Palladium catalyst Pd1, (0.25%) in a minimum amount of dichloromethane (<1 ml), was added to this monomer composition and gel formation was observed in 110 minutes under ambient conditions without stirring or agitation. Properties of the gel included tear strength (ASTM D624) of 6.1 lbf/in; Shore 00 hardness of 69; tensile strength at break (ASTM D412) of 16.7 psi and tensile strain at break of 176%.

Simultaneous Cure Example 3

Addition of 0.5% palladium, dissolved in a minimum amount of dichloromethane, to L-207 caused no increase in viscosity over a period of several months. This behavior contrasts with the polymer epoxy formation that occurs in the presence of an α-olefin.

Example 4

| Two Part Example | | | |
|---|---|---|---|
| part A: | Dodecene | 20.0 g | (79.8%) |
| | L-207 | 5.0 g | (19.9%) |
| | (BI)pd$_2$MeCl | 0.075 g | (0.15%) |
| part B: | Dodecene | 20.0 g | (79.8%) |
| | L-207 | 5.0 g | (19.9%) |
| | Ag$^+$N(SO$_2$C$_2$F$_5$)$_2^-$ | 0.069 g | (0.14%) |

50 g of a solution of 20% L-207 in dodecene was split evenly into part A and part B. (BI)PdMeCl (0.075 g) was dissolved in a minimum amount of dichloromethane and stirred into part A. Ag$^+$N(SO$_2$C$_2$F$_5$)$_2^-$ was dissolved in a minimum amount of diethyl ether and stirred into part B. Parts A and B were then poured together and stirred. Gel formation under ambient conditions occurred after 18 minutes. The cured material had a Shore 00 hardness of 76.

Example 5

Cyclohexyl Epoxy-functionalized Siloxane Example

| Cyclohexyl Epoxy-functionalized Siloxane Example | |
|---|---|
| dodecene | 6.0 g (59.8%) |
| EMS-232 | 4.0 g (39.9%) |
| Pd1 catalyst | 0.030 mg (0.3%) |

A cyclohexyl epoxy functionalized siloxane, EMS-232, available from Gelest, was dissolved in dodecene to prepare a homogeneous solution. Palladium catalyst (0.3%) was dissolved in a minimum amount of dichloromethane, added to the epoxy/olefin solution, and shaken to distribute catalyst evenly. After sitting at ambient conditions for 60 minutes, the solution had gelled to form a white/yellow soft waxy solid, which remained undissolved in toluene after 72 hours.

Examples 6–29

Semi-interpenetrating polymer networks ("SIPN") were formed by the simultaneous polymerization method described above, having following compositions listed in the table below. Each SIPN was first measured for initial viscosity values, and then tested for material properties such as hardness (using shore 00), tensile properties, and tear strength. Tensile properties were tested according to ASTM D412-97, Test Method B (dumbbell specimens). Tear Strength was tested according to ASTM D624-91. As can be seen, SIPNs having a variety of properties can be produced according to the invention.

|  | formulation (% composition) | | | | material properties | | | |
|---|---|---|---|---|---|---|---|---|
|  |  |  |  |  | initial |  | tensile | tensile | tear |
| Ex. # | α-olefin | L-207 | Kaydol oil | Pd1 catalyst | viscosity (cP) | hardness (Shore 00) | strength (psi) | strain (%) | strength (lbf/in) |
| 6 | C8 55.84 | 23.93 | 20.0 | 0.223 | 12.9 | 54 | 14.0 | 305 | 2.4 |
| 7 | C8 54.85 | 44.88 | 0 | 0.274 | 46.8 | 77 | 153.0 | 630 | 6.6 |
| 8 | C8 79.81 | 19.95 | 0 | 0.239 | 3.6 | 66 | 129.1 | 1060 | 3.3 |
| 9 | C8 32.91 | 26.93 | 40.0 | 0.165 | 56.7 | 43 | 16.0 | 220 | 4.5 |
| 10 | C8 32.95 | 26.96 | 40.0 | 0.099 | 57.0 | 21 | 9.7 | 347 | 3.8 |
| 11 | C8 54.91 | 44.93 | 0 | 0.165 | 56.7 | 56 | 63.8 | 947 | 9.1 |
| 12 | C8 79.68 | 19.92 | 0 | 0.398 | 3.9 | 44 | 51.8 | 586 | 7.9 |
| 13 | C8 47.81 | 11.95 | 40.0 | 0.239 | 8.1 | 80 | 8.9 | 196 | 2.1 |
| 14 | C12 55.84 | 23.93 | 20.0 | 0.223 | 34.5 | 80 | 328 | 383 | 39.1 |
| 15 | C12 54.85 | 44.88 | 0 | 0.274 | 146.8 | 91 | 411 | 155 | 55.6 |
| 16 | C12 84.64 | 14.94 | 0 | 0.423 | 6.3 | 86 | 625 | 380 | 103.0 |
| 17 | C12 32.95 | 26.96 | 40.0 | 0.099 | 119.4 | 26 | 28.4 | 246 | 5.0 |
| 18 | C12 50.87 | 8.98 | 40.0 | 0.153 | 11.7 | 10 | 12.7 | 302 | 2.9 |
| 19 | C12 84.78 | 14.96 | 0 | 0.254 | 6.8 | 83 | 107 | 129 | 18.2 |
| 20 | C12 54.91 | 44.93 | 0 | 0.165 | 141.9 | 78 | 255 | 428 | 25.6 |
| 21 | C12 50.78 | 8.96 | 40.0 | 0.254 | 11.1 | 69 | 16.7 | 176 | 6.1 |
| 22 | C12 32.91 | 26.93 | 40.0 | 0.165 | 119.4 | 62 | 130 | 243 | 14.5 |
| 23 | C18 55.84 | 23.93 | 20.0 | 0.223 | 99.0 | 74 | 158 | 224 | 20.2 |
| 24 | C18 84.78 | 14.96 | 0 | 0.254 | 23.5 | 90 | 208 | 149 | 38.3 |
| 25 | C18 54.91 | 44.93 | 0 | 0.165 | 400 | 59 | 102 | 340 | 16.0 |
| 26 | C18 32.91 | 26.93 | 40.0 | 0.165 | 265 | 35 | 54.9 | 301 | 8.2 |
| 27 | C18 84.64 | 14.94 | 0 | 0.423 | 25.0 | 86 | 272 | 92 | 57.6 |
| 28 | C18 50.78 | 8.96 | 40.0 | 0.254 | 32.0 | 56 | 42.9 | 93 | 5.97 |
| 29 | C18 54.85 | 44.88 | 0 | 0.274 | 434 | 90 | 357 | 202 | 59.7 |

Example 30

| Sequential Cure Example | |
|---|---|
| dodecene | 15 g (75%) |
| Heloxy 71 | 4.5 g (22.5%) |
| Tone 0301 | 0.33 g (1.7%) |
| Ar$_3$S$^+$SbF$_6^-$ (1:1 in propylene carbonate) | 0.135 g (0.7%) |
| Pd1 catalyst | 0.04 g (0.2%) |

All ingredients are combined and left to sit under ambient conditions without stirring. Initial gelation to a viscous liquid is observed within 35 minutes and the composition forms a very soft wax after six hours. The sample is then heated to 150° C. for one hour. Following removal from the oven, the sample is hard and brittle with barely visible polyepoxy domains.

Example 31

| Sequential Cure Example | |
|---|---|
| dodecene | 15 g (70.6%) |
| Epon 828 | 3 g (14.1%) |
| Toluene | 3 g (14.1%) |
| Ar$_3$S$^+$SbF$_6^-$ (1:1 in propylene carbonate) | 0.180 g (0.8%) |
| Pd1 catalyst | 0.06 g (0.3%) |

All ingredients are combined and left to sit under ambient conditions without stirring. Initial gelation to a viscous liquid is observed within 50 minutes and the composition forms a very soft wax with a small amount of chalky white skin on top after six hours. The sample is then heated to 150° C. for one hour. Following removal from the oven, the sample is hard and fairly brittle with visible polyepoxy domains.

Example 31C

| Comparative Sequential Cure Example | |
|---|---|
| dodecene | 15 g (71.2%) |
| Epon 828 | 3 g (14.2%) |
| Toluene | 3 g (14.2%) |
| Pd1 catalyst | 0.06 g (0.3%) |

All ingredients are combined and left to sit under ambient conditions without stirring. Initial gelation to a viscous liquid is observed within 45 minutes and the composition forms a very soft wax with a chalky white skin on top after six hours. The sample is then heated to 150° C. for one hour. Following removal from the oven, the sample appears as a hard waxy material with isolated patches of unreacted epoxy monomer.

What is claimed is:

1. A semi-interpenetrating polymer network produced from a reactive composition comprising:
   at least one non-glycidyl epoxy monomer;
   at least one olefin monomer forming a co-monomer mixture with said non-glycidyl epoxy monomer; and
   at least one palladium compound uniformly distributed in said co-monomer mixture, said reactive composition forming said semi-interpenetrating network under ambient conditions.

2. The semi-interpenetrating polymer network of claim 1 wherein said reactive composition contains from about 0.05 to about 5.0 weight percent of said palladium compound.

3. The semi-interpenetrating polymer network of claim 1 wherein said reactive composition contains from about 5% to about 95% of said non-glycidyl epoxy monomer.

4. The semi-interpenetrating polymer network of claim 1 wherein said reactive composition contains from about 5% to about 95% of said olefin monomer.

5. The semi-interpenetrating polymer network of claim 1 wherein said epoxy monomer contains a plurality of internal non-glycidyl epoxy structures.

6. The semi-interpenetrating polymer network of claim 1 wherein said olefin monomer comprises a liquid α-olefin.

7. The semi-interpenetrating polymer network of claim 5 wherein said non-glycidyl epoxy monomer comprises a block copolymer containing an epoxidized isoprene block and a saturated ethylene/butylene block having a terminal hydroxyl group.

8. The semi-interpenetrating polymer network of claim 6 wherein said α-olefin is selected from the group consisting of hexene, octene, decene, dodecene, tetradecene, hexadecene, and octadecene.

9. The semi-interpenetrating polymer network of claim 1 wherein said catalyst is a two-part catalyst comprising two reagents, a neutral organometallic palladium compound and a co-catalyst salt, said reagents reacting when mixed to yield an active catalyst.

10. The semi-interpenetrating polymer network of claim 1 further comprising an epoxy catalyst, said catalyst being mixed with said epoxy monomer for polymerization thereof.

11. The process of claim 10 wherein said epoxy catalyst is selected from the group consisting of thermally initiated catalysts.

12. The process of claim 10 wherein said epoxy catalyst is selected from the group consisting of free-radical and Lewis acid catalysts.

13. A sealant formed from formed from the semi-interpenetrating polymer network of claim 1.

14. An adhesive formed from the semi-interpenetrating polymer network of claim 1.

15. A vibration dampening material formed from the semi-interpenetrating polymer network of claim 1.

16. A low viscosity medium for resin delivery formed from the semi-interpenetrating polymer network of claim 1.

* * * * *

UNITED STATES PATENT AND TRADEMARK OFFICE
CERTIFICATE OF CORRECTION

PATENT NO. : 6,355,735 B1
APPLICATION NO. : 09/375706
DATED : March 12, 2002
INVENTOR(S) : Mark I. Wagner It is certified that error appears in the above-identified patent and that said Letters Patent is hereby corrected as shown below:

Title Page, Col. 2, Item [57] in the (Abstract)
Line 1, before "semi-interpenetrating" insert -- composition capable of forming a --.
Line 1, after "network" insert -- , said composition --.
Line 2, after "olefin monomer" insert -- , --.
Line 3, after "monomer" insert -- ; --.
Line 4, after "compound" insert -- , --.
Line 6, delete "the" and insert -- such --, therefor.

Col. 1
Line 41, delete "nuclcophilic" and insert -- nucleophilic --, therefor.

Col. 2
Line 23, delete "thennal" and insert -- thermal --, therefor.

Col. 4
Line 53, delete "propylene," and insert -- propene, --, therefor.

Col. 5
Line 8, delete "Kratong®" and insert -- Kraton® --, therefor.

Col. 6
Line 24, delete "(*J*" and insert -- (*J*. --, therefor.

Col. 7
Lines 13-14, delete "tetralhydrofuran" and insert -- tetrahydrofuran --, therefor.
Line 23, delete "PF6," and insert -- $PF_6$, --, therefor.
Line 45, delete "[((2," and insert -- [((2,6 --, therefor.

Col. 8
Line 41, delete "diisopropylphenyl )N" and insert -- diisopropylphenyl)N --, therefor.

Col. 9
Line 4, delete "$Na^+[BF_4]^{31}$," and insert -- $Na^+[BF_4]^-$, --, therefor.
Lines 4-5, delete "$NA^+[SbF_6]^-$," and insert -- $Na^+[SbF_6]^-$, --, therefor.
Line 6, delete "$Na^+[SO_3C_4F_9]^{31}$," and insert -- $Na^+[SO_3C_4F_9]^-$, --, therefor.
Line 53, delete "$^a$a" and insert -- $^a$ --, therefor.

UNITED STATES PATENT AND TRADEMARK OFFICE
CERTIFICATE OF CORRECTION

PATENT NO. : 6,355,735 B1
APPLICATION NO. : 09/375706
DATED : March 12, 2002
INVENTOR(S) : Mark I. Wagner It is certified that error appears in the above-identified patent and that said Letters Patent is hereby corrected as shown below:

Col. 12
Line 8, delete "(Bl)pd$_2$MeCl" and insert -- (Bl)Pd2MeCl --, therefor.
Line 18, delete "Ag$^+$N(SO$_2$C$_2$F$_5$)$_2^-$was" and insert -- Ag$^+$N(SO$_2$C$_2$F$_5$)$_2^-$ was --, therefor. (Consider Space)
Line 30, below "Example 5" delete "Cyclohexyl Epoxy-functionalized Siloxane Example".
Line 42, delete "siloxanc," and insert -- siloxane, --, therefor.

Col. 13
Line 57, delete "030I" and insert -- 0301 --, therefor.

Col. 15
Line 28, in Claim 1, after "monomer" insert -- , --.
Line 30, in Claim 1, after "compound" insert -- , --.

Signed and Sealed this

First Day of April, 2008

JON W. DUDAS
*Director of the United States Patent and Trademark Office*